US008746572B2

(12) United States Patent
Yamaguchi

(10) Patent No.: US 8,746,572 B2
(45) Date of Patent: Jun. 10, 2014

(54) IMAGE PROCESSING APPARATUS AND IMAGE PROCESSING METHOD

(71) Applicant: Fujitsu Limited, Kawasaki (JP)

(72) Inventor: Nobuyasu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/018,156

(22) Filed: Sep. 4, 2013

(65) Prior Publication Data

US 2014/0008442 A1   Jan. 9, 2014

Related U.S. Application Data

(63) Continuation of application No. PCT/JP2011/056465, filed on Mar. 17, 2011.

(51) Int. Cl.
*G06K 7/10* (2006.01)

(52) U.S. Cl.
USPC .......................... 235/470; 235/494; 235/454

(58) Field of Classification Search
USPC ............... 235/470, 462.1, 494, 454
See application file for complete search history.

(56) References Cited

U.S. PATENT DOCUMENTS

| 5,616,905 | A | 4/1997 | Sugiyama | |
|---|---|---|---|---|
| 2005/0242186 | A1 | 11/2005 | Ohbuchi | |
| 2007/0297679 | A1* | 12/2007 | Sato | 382/192 |
| 2009/0326836 | A1* | 12/2009 | Hovis et al. | 702/42 |
| 2010/0246984 | A1* | 9/2010 | Cheong et al. | 382/233 |
| 2011/0290880 | A1* | 12/2011 | Cai et al. | 235/437 |

FOREIGN PATENT DOCUMENTS

| JP | 7-234915 | 9/1995 |
|---|---|---|
| JP | 10-63772 | 3/1998 |
| JP | 2002-329163 | 11/2002 |
| JP | 2005-316755 | 11/2005 |
| JP | 2008-102952 | 5/2008 |

OTHER PUBLICATIONS

International Search Report mailed Jun. 14, 2011 in corresponding International Application No. PCT/JP2011/056465.
Patent Abstracts of Japan, Publication No. 10-063772, Published Mar. 6, 1998.
Patent Abstracts of Japan, Publication No. 2002-329163, Published Nov. 15, 2002.
Patent Abstracts of Japan, Publication No. 2008-102952, Published May 1, 2008.

* cited by examiner

*Primary Examiner* — Edwyn Labaze
(74) *Attorney, Agent, or Firm* — Staas & Halsey LLP

(57) ABSTRACT

An image processing apparatus includes a candidate point detecting section configured to detect a plurality of candidate points on a boundary of a code region of a two-dimensional code in an image capturing the two-dimensional code, by scanning the image starting from an internal point of the two-dimensional code in the image, the two-dimensional code including a plurality of modules being arranged in two dimensions; a calculating section configured to calculate a first boundary line using the candidate points; a selecting section configured to select the candidate points located within a distance less than a threshold value from the first boundary line; and a boundary line detecting section configured to detect a second boundary line calculated using the selected candidate points selected by the selecting section.

10 Claims, 18 Drawing Sheets

FIG.7

| SERIAL NUMBER | X COORDINATE | Y COORDINATE |
|---|---|---|
| 1 | 4.5 | 4.1 |
| 2 | 5.3 | 9.6 |
| 3 | 6.1 | 8.1 |
| 4 | 6.9 | 6.2 |
| 5 | 7.7 | 6.3 |
| 6 | 8.5 | 12.4 |
| 7 | 9.3 | 16.8 |
| 8 | 10.1 | 17.4 |
| 9 | 10.9 | 7.8 |
| 10 | 11.7 | 9.7 |
| 11 | 12.5 | 9.8 |
| 12 | 13.3 | 9.5 |
| . | . | . |
| . | . | . |

| SERIAL NUMBER | X COORDINATE | Y COORDINATE | DISTANCE FROM TEMPORARY APPROXIMATE LINE | SELECTION RESULT |
|---|---|---|---|---|
| 1 | 4.5 | 4.1 | 0.6 | ○ |
| 2 | 5.3 | 9.6 | 5.6 | × |
| 3 | 6.1 | 8.1 | 3.7 | × |
| 4 | 6.9 | 6.2 | 1.3 | ○ |
| 5 | 7.7 | 6.3 | 1.0 | ○ |
| 6 | 8.5 | 12.4 | 6.6 | × |
| 7 | 9.3 | 16.8 | 10.6 | × |
| 8 | 10.1 | 17.4 | 10.7 | × |
| 9 | 10.9 | 7.8 | 0.7 | ○ |
| 10 | 11.7 | 9.7 | 2.1 | × |
| 11 | 12.5 | 9.8 | 1.8 | × |
| 12 | 13.3 | 9.5 | 1.0 | ○ |
| . | . | . | . | . |
| . | . | . | . | . |

| SERIAL NUMBER | X COORDINATE | Y COORDINATE |
|---|---|---|
| 1 | 4.5 | 4.1 |
| 4 | 6.9 | 6.2 |
| 5 | 7.7 | 6.3 |
| 9 | 10.9 | 7.8 |
| 12 | 13.3 | 9.5 |
| . | . | . |
| . | . | . |

FIG.14

| No. | BRIGHT/DARK MODULE PAIR LENGTH |
|---|---|
| a1 | 18 |
| a2 | 13 |
| a3 | 14 |
| a4 | 18 |
| a5 | 16 |
| a6 | 16 |
| a7 | 16 |
| a8 | 17 |
| a9 | 13 |
| a10 | 18 |
| a11 | 18 |
| a12 | 34 |
| a13 | 17 |
| a14 | 15 |

FIG.15

| No. | BRIGHT/DARK MODULE PAIR LENGTH |
|---|---|
| a9 | 13 |
| a2 | 13 |
| a3 | 14 |
| a14 | 15 |
| a5 | 16 |
| a6 | 16 |
| a7 | 16 |
| a13 | 17 |
| a8 | 17 |
| a10 | 18 |
| a11 | 18 |
| a4 | 18 |
| a1 | 18 |
| a12 | 34 |

FIG.16

| No. | BRIGHT/DARK MODULE PAIR LENGTH | ACCUMULATED MOVING AVERAGE VALUE | RATIO TO AVERAGE |
|---|---|---|---|
| a9 | 13 | 13.00 | 1.00 |
| a2 | 13 | 13.00 | 1.00 |
| a3 | 14 | 13.33 | 1.05 |
| a14 | 15 | 13.75 | 1.09 |
| a5 | 16 | 14.20 | 1.13 |
| a6 | 16 | 14.50 | 1.10 |
| a7 | 16 | 14.71 | 1.09 |
| a13 | 17 | 15.00 | 1.13 |
| a8 | 17 | 15.22 | 1.12 |
| a4 | 18 | 15.50 | 1.16 |
| a10 | 18 | 15.73 | 1.14 |
| a11 | 18 | 15.92 | 1.13 |
| a1 | 18 | 16.08 | 1.12 |
| a12 | 34 | 17.36 | 1.96 |

IMAGE PROCESSING APPARATUS AND IMAGE PROCESSING METHOD

CROSS-REFERENCE TO RELATED APPLICATIONS

This application is a continuation application of International Application PCT/JP2011/056465 filed on Mar. 17, 2011 which designates the U.S., the entire contents of which are incorporated herein by reference.

FIELD

The disclosures herein generally relate to an image processing apparatus and an image processing method for processing an image in which a two-dimensional code is captured.

BACKGROUND

In a two-dimensional code, square elements (also called modules) having predetermined sizes are arranged in two-dimension (horizontally and vertically) to form a grid-like pattern, and an arrangement of bright and dark (white or black) modules represents a piece of data. To decode such a two-dimensional code, positions of individual modules in a captured image are correctly determined, then black or white at the positions are correctly determined.

A two-dimensional code includes a mark having a predetermined specific form that makes detection of positions of modules easy with high precision. A position detection pattern in a QR code (trademark) and a finder pattern in a DataMatrix (trademark) are examples of the marks.

Also, a two-dimensional code includes a pattern in which predetermined-sized black/white modules are alternately arranged along a straight line. Such a pattern is called a "timing pattern" that represents physical characteristics of the data such as the code size or the module size.

FIGS. 1A-1B are schematic views illustrating examples of two-dimensional codes. FIG. 1A is an example of a DataMatrix (trademark). A pattern 11 illustrated in FIG. 1A is a timing pattern, and a pattern 12 illustrated in FIG. 1A is a finder pattern.

FIG. 1B is an example of a QR code (trademark). A pattern 13 illustrated in FIG. 1B is a timing pattern similar to FIG. 1A. A pattern 14 illustrated in FIG. 1B is a position detection pattern.

To detect such patterns illustrated in FIGS. 1A-1B with high precision, it is important to locate the position of the external boundary line of a code. To detect the code boundary with high speed, there is a technology that recognizes white pixels arranged on a straight line outside of a code boundary as a code boundary.

FIG. 2 is a schematic view illustrating such a conventional method of detecting a boundary line. As illustrated in FIG. 2, scanning starts from a point 15 in a code, directing outwards, and detects a position from which white pixels are arranged continuously, and the position is recognized as being on a boundary line. Also, there are various technologies to capture two-dimensional codes.

RELATED-ART DOCUMENTS

Patent Documents

[Patent Document 1] Japanese Laid-open Patent Publication No. 2008-102952

[Patent Document 2] Japanese Laid-open Patent Publication No. 2002-329163

[Patent Document 3] Japanese Laid-open Patent Publication No. 10-63772

However, for example, if one uses an inexpensive digital camera such as used in a cellular phone, it is often inevitable to use an image captured with a low number of pixels and a low resolution due to a defocus caused by lens characteristics and limited processing capability.

FIG. 3 is a schematic view illustrating a conventional problem. An image 20 illustrated in FIG. 3 is an example of an image in which a two-dimensional code is captured. Another image 21 in FIG. 3 is an enlarged view of the image 20 that includes a part of the two-dimensional code. As illustrated in the image 21, a boundary line is not correctly detected because the boundary line is defocused and distorted.

For example, if one calculates the boundary line with a conventional technology, an external tangent line of the two-dimensional code is detected as a boundary line 25, which is shifted outwards from a realistic boundary line 26 that should be detected.

Therefore, with such a conventional technology, there is a problem in that the position of a boundary line cannot be correctly obtained because boundary lines at the perimeter of the two-dimensional code may be captured defocused or distorted.

SUMMARY

According to an embodiment of the present invention, an image processing apparatus includes: a candidate point detecting section configured to detect a plurality of candidate points on a boundary of a code region of a two-dimensional code in an image capturing the two-dimensional code, by scanning the image starting from an internal point of the two-dimensional code in the image, the two-dimensional code including a plurality of modules being arranged in two dimensions; a calculating section configured to calculate a first boundary line using the candidate points; a selecting section configured to select the candidate points located within a distance less than a threshold value from the first boundary line; and a boundary line detecting section configured to detect a second boundary line calculated using the selected candidate points selected by the selecting section.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 7 is a schematic view illustrating an example of a data table of candidate boundary points;

FIG. 8 is a schematic view illustrating an example of a data table of candidate boundary points with selection results;

FIG. 9 is a schematic view illustrating an example of a data table of candidate boundary points after selection;

FIG. 14 is a schematic view illustrating an example of calculated bright/dark module pair lengths;

FIG. 15 is a schematic view illustrating an example of bright/dark module pair lengths after sorting;

FIG. 16 is a schematic view illustrating an example of accumulated moving average values and ratios to the average values;

DESCRIPTION OF EMBODIMENTS

In the following, embodiments of the present invention will be described with reference to the drawings. According to an embodiment of the present invention, it is possible to improve precision for detecting a boundary line of a two-dimensional code.

[Embodiment]

<Configuration>

Figure 1A:
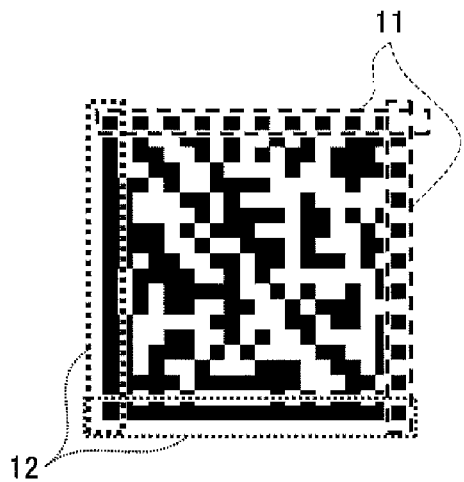
FIGS. 1A-1B are schematic views illustrating examples of two-dimensional codes.
Figure 1B:
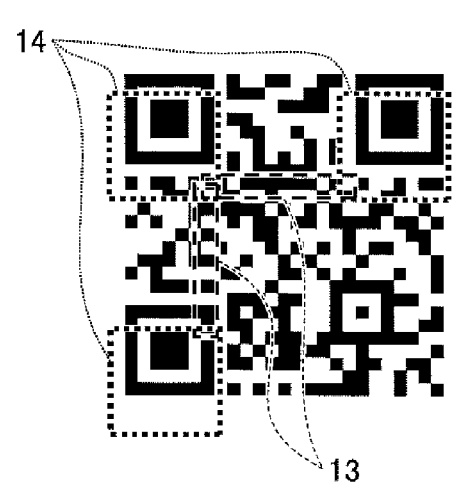
Figure 2:
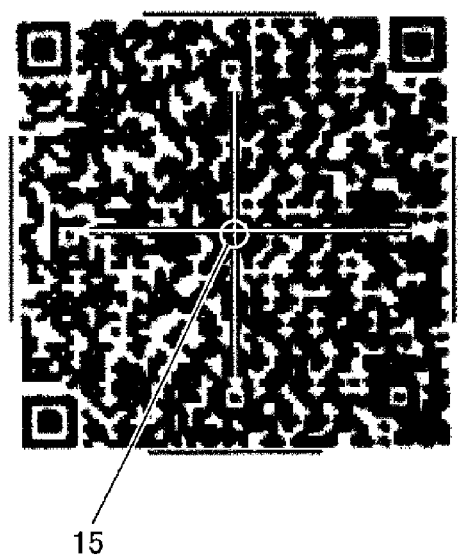
FIG. 2 is a schematic view illustrating a conventional method of detecting a boundary line.
Figure 3:
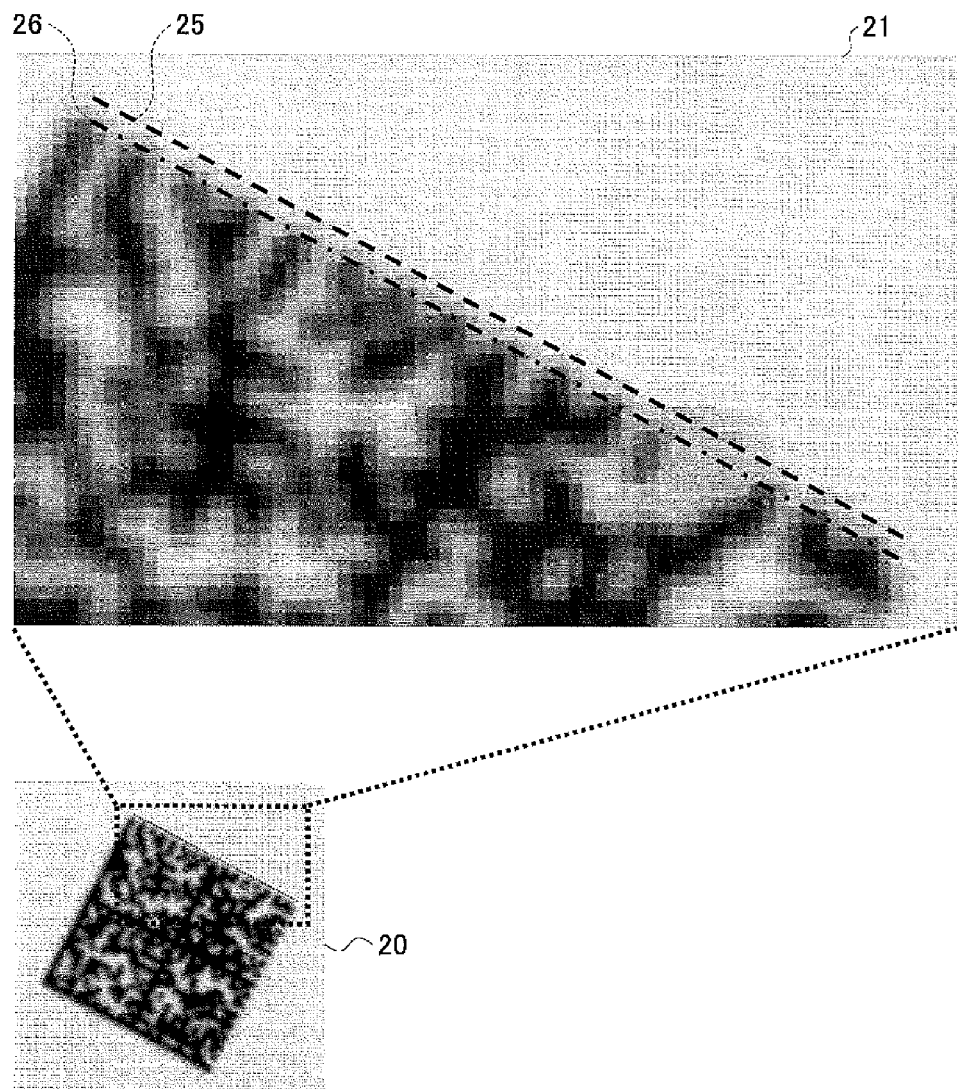
FIG. 3 is a schematic view illustrating a conventional problem.
Figure 4:
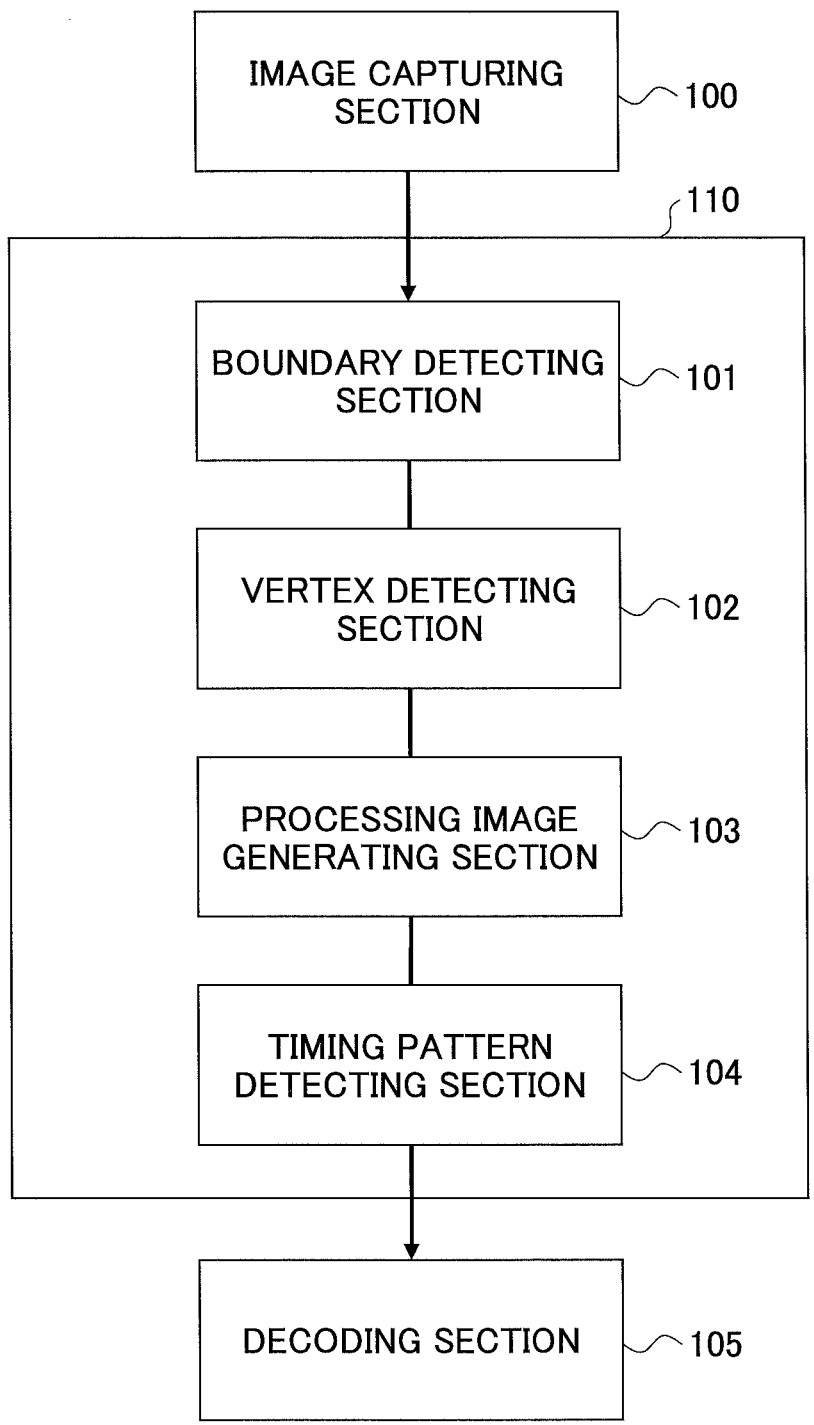
FIG. 4 is a block diagram illustrating an example of a configuration of an image processing apparatus according to an embodiment.

FIG. 4 is a block diagram illustrating an example of a configuration of an image processing apparatus 110 according to an embodiment. The image processing apparatus 110 illustrated in FIG. 4 includes a boundary detecting section 101, a vertex detecting section 102, a processing image generating section 103, and a timing pattern detecting section 104. Here, the image processing apparatus 110 may include an image capturing section 100, a decoding section 105, and other sections such as a display section.

The image capturing section 100 generates an image that captures a two-dimensional code. The generated image is output to the boundary detecting section 101.

The boundary detecting section 101 detects a boundary line between a code region of the two-dimensional code and a marginal region surrounding the code in the image of the two-dimensional code captured by the image capturing section 100. Such a marginal region is called a "quiet zone". Here, four boundary lines of the two-dimensional code are assumed to be detected by the same process.

The vertex detecting section 102 extends both ends of each of the four boundary lines detected by the boundary detecting section 101, to detect cross points as four vertices of the code region. With higher precision of boundary line detection, the four vertices are determined also with higher precision. Lines connecting the four vertices form a quadrilateral that includes the code region inside of it. The positions of the four vertices are used as reference points in the subsequent processes.

The processing image generating section 103 extracts a part of the image data as image data to be processed based on a rotation angle of the code boundary detected by the vertex detecting section 102 and the resolution of the captured image. Here, the number of pixels on a side of a predetermined-sized module is used as a reference. The module here is a minimum unit cell that constitutes the symbol of a two-dimensional code.

If the image to be processed is rotated or captured with a low resolution, the processing image generating section 103 compensates the rotation angle, or executes an enlargement or reduction process, to generate image data to be processed. The enlargement or reduction ratio is adjusted so that the resolution of the image data to be processed takes a value suitable for the subsequent processes.

The processing image generating section 103 adjusts the number of pixels per side of a module, for example, to two to eight pixels. In general, two to eight pixels per side are considered to be appropriate for processing.

The timing pattern detecting section 104 detects the module size and code size of the two-dimensional code using an image including a timing pattern among the images to be processed generated by the processing image generating section 103. The module size is represented by the number of pixels per side of the predetermined-sized module, and the code size is represented by the number of modules per side of the two-dimensional code.

The decoding section 105 decodes the two-dimensional code using values obtained by the sections above to extract data encoded in the two-dimensional code. The extracted data is output to the display section or the like. Next, contents of processes executed by the sections will be described.

(Boundary Detection Process)

Figure 5:
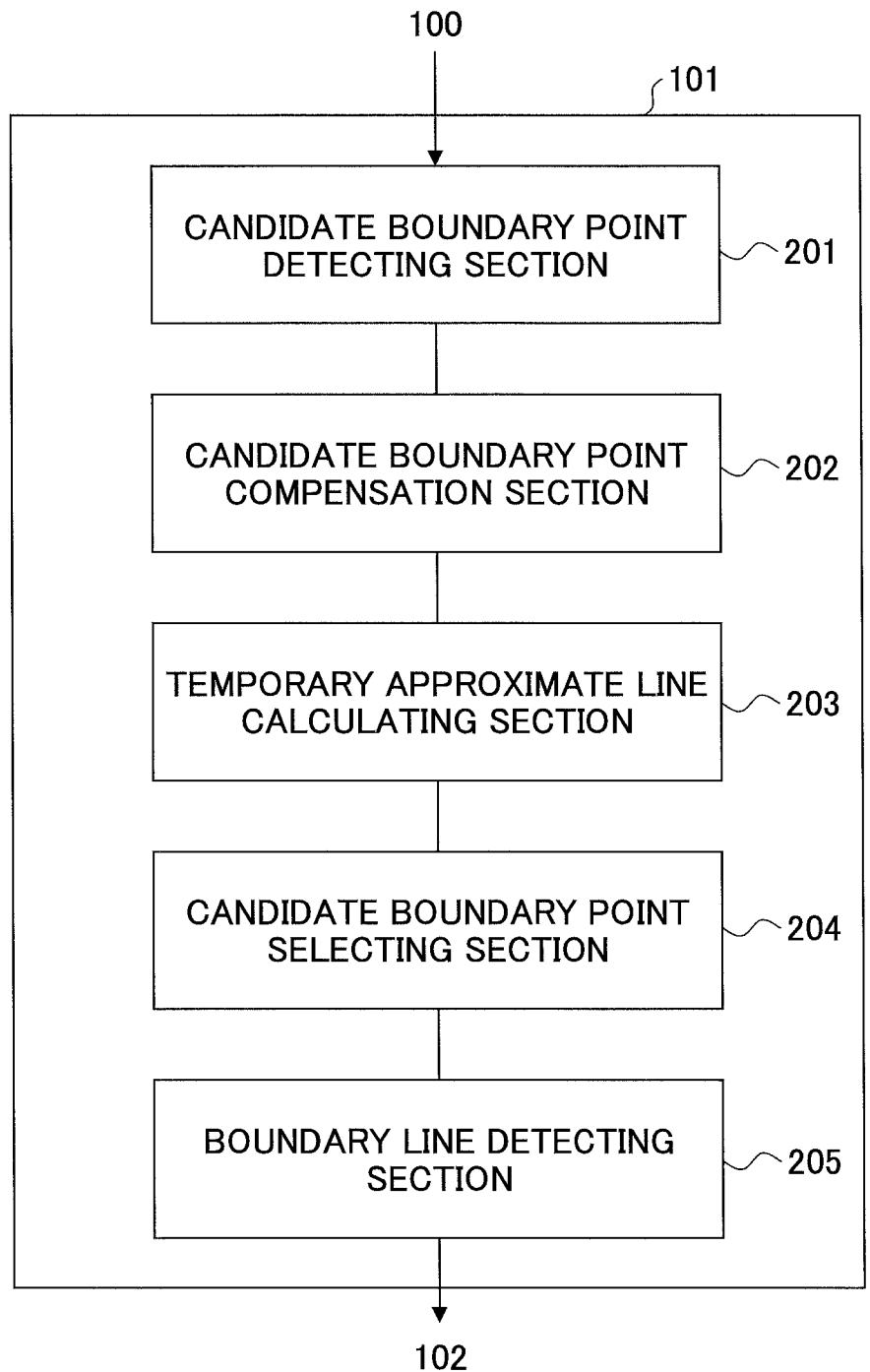
FIG. 5 is a block diagram illustrating an example of a configuration of a boundary detecting section.

FIG. 5 is a block diagram illustrating an example of a configuration of the boundary detecting section 101. The boundary detecting section 101 illustrated in FIG. 5 includes a candidate boundary point detecting section 201, a candidate boundary point compensation section 202, a temporary approximate line calculating section 203, a candidate boundary point selecting section 204, and a boundary line detecting section 205.

The candidate boundary point detecting section 201 scans pixels of the image data from the inside to the outside on the two-dimensional code to detect a point at which the pixel changes from dark (for example, black) to bright (for example, white) as a candidate point on a boundary line. The candidate boundary point detecting section 201 may detect a candidate point by finding a series of continuous white pixels, for example, as disclosed in Japanese Laid-open Patent Publication No. 2008-102952. A candidate point of a boundary line is called a candidate boundary point.

When scanning pixels, the candidate boundary point detecting section 201 estimates the size of a module. For example, the candidate boundary point detecting section 201 obtains the width of black pixels and white pixels on scanning lines for detecting candidate boundary points, then calculates the average value of minimum widths on the scanning lines to set it as the estimated size of a module.

The candidate boundary point compensation section 202 corrects the position of the candidate boundary point detected by the candidate boundary point detecting section 201 so that its shade value becomes proportionate to the shade values of adjacent pixels with interpolation, to improve precision of the position of the candidate boundary point becomes higher than units of pixels. This step is not necessarily required.

The temporary approximate line calculating section 203 obtains a temporary approximate line using multiple candidate boundary points after interpolation by the candidate boundary point compensation section 202. For obtaining an approximate line, although a least squares method, for example, is generally used, other methods may be used such as Hough transform or usage of an external tangent line of candidate boundary points outside of a code. An approximate line calculated by the temporary approximate line calculating section 203 is called a "temporary approximate line".

The candidate boundary point selecting section 204 selects candidate boundary points whose distances from the temporary approximate line calculated by the temporary approximate line calculating section 203 are within a predetermined threshold value. The candidate boundary point selecting section 204 may select candidate boundary points within a predetermined range from the temporary approximate line. Candidate boundary points whose distances from the temporary approximate line exceed the threshold value are determined that they are not correctly detected due to an influence of defocus or distortion, and are excluded.

The threshold value may be, for example, a predetermined reference value, or the module size estimated by the candidate boundary point detecting section 201. If the module size is used as the threshold value, it is possible to select appropriate candidate boundary points depending on a two-dimensional code that is captured.

Also, if an external tangent line is used as a temporary approximate line, the candidate boundary point selecting section 204 may select candidate boundary points that are within a threshold value from the temporary approximate line in the direction inwards to the image. This is because there are no candidate boundary points in the direction outwards from the image if an external tangent line is used as a temporary approximate line. This makes it possible to efficiently select candidate boundary points.

The boundary line detecting section 205 calculates the approximate line again using the multiple candidate boundary points selected by the candidate boundary point selecting section 204 to detect an approximate line as the boundary line. In this case, a least squares method or the like may be used for obtaining the approximate line. The obtained boundary line is output to the vertex detecting section 102.

Figure 6:
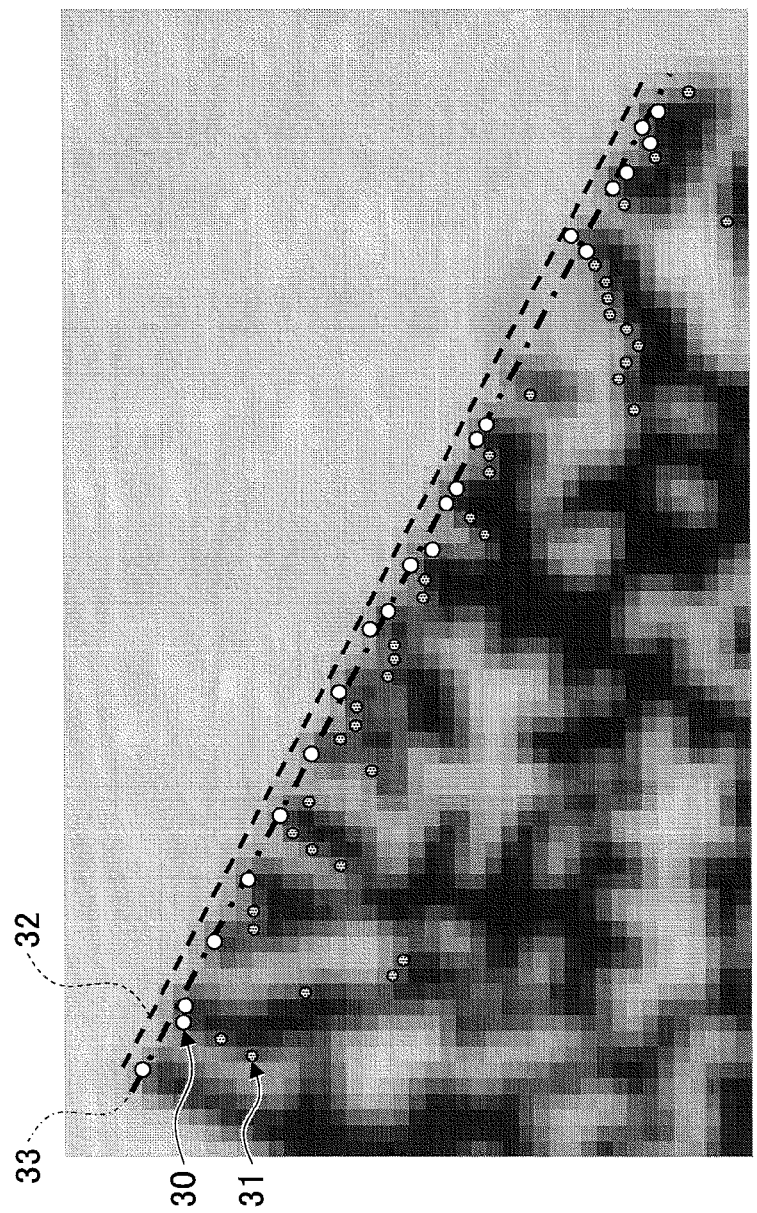
FIG. 6 is a schematic view illustrating a process for detecting a boundary line.

FIG. 6 is a schematic view illustrating a process for detecting a boundary line. A boundary line detection process will be concretely described using FIG. 6. In an example illustrated in FIG. 6, an external tangent line is used for calculating a temporary approximate line, and a least squares method is used for calculating a boundary line.

Also, in the example illustrated in FIG. 6, the captured image is defocused and distorted due to characteristics of a camera and an insufficient resolution. Also, in the example illustrated in FIG. 6, a two-dimensional code has been captured in a rotated state, which generates a false outline along a jagged boundary line.

The candidate boundary point calculating section 201 detects candidate boundary points by scanning pixels upwards in the vertical direction from the inside of the two-dimensional code. Circular marks illustrated in FIG. 6 (including white circles 30 and gray circles 31) designate detected candidate boundary points.

With this detection process, points inside of the code that are actually not on the boundary are detected. Also, the positions of some detected points close to the boundary are deviated due to an influence of the false outline.

FIG. 7 is a schematic view illustrating an example of a data table of candidate boundary points. As illustrated in FIG. 7, each candidate boundary point has a serial number, an X coordinate value and a Y coordinate value associated with it.

Using the multiple detected candidate boundary points, the temporary approximate line calculating section 203 calculates an external tangent line of the candidate boundary points as a temporary approximate line 32. As illustrated in FIG. 6, the calculated temporary approximate line 32 is positioned outside of the two-dimensional code due to the influence of the false outline, which prevents the subsequent processes from operating correctly.

The candidate boundary point selecting section 204 selects candidate points that are positioned within a predetermined range from the approximate line 32. The predetermined range is set using the module size Xm as a reference. The module size Xm can be estimated from distribution of sizes of modules inside of the two-dimensional code.

On a timing pattern, unit-sized modules are lined up in which a dark module and a bright module appear alternately. Therefore, for selecting candidate boundary points, a reference selection range (the predetermined range), which is assumed to be half of the estimated module size, is obtained by the following formula (1).

$$Lim0 = \pm Xm/2 \qquad \text{formula (1)}$$

The candidate boundary point selecting section 204 selects candidate boundary points that are positioned within the reference selection range from the temporary approximate line. However, a range smaller than the range Lim0 may be used if error difference for detecting candidate boundary points can be predicted to be small. Conversely, if error difference for detecting candidate boundary points is predicted to be great, a range greater than the range Lim0 may be used ($\pm Xm$, $\pm Xm \times 1.5$, or the like).

A range where error difference for detecting candidate boundary points is predicted to be small is, for example, the center portion of a boundary line, whereas a range where error difference for detecting candidate boundary points is predicted to be great is an end portion of a boundary line.

Alternatively, after selecting candidate boundary points, the candidate boundary point selecting section 204 may obtain a temporary approximate line again for the selected candidate boundary point using a different method, then select candidate boundary points again using the range Lim0 (for example, $\pm Xm/2$).

Here, in the example illustrated in FIG. 6, as the temporary approximate line is an external tangent line, the candidate boundary point selecting section 204 may select candidate boundary points that are within a range of, for example, Xm/2 from the temporary approximate line in the direction inwards to the image.

The white circles 30 in FIG. 6 designate the selected candidate boundary points, and the gray circles 31 designate the candidate boundary points that are not selected.

FIG. 8 is a schematic view illustrating an example of a data table of candidate boundary points with selection results. FIG. 8 illustrates an example with Xm=3.0 and Lim0=1.5. As illustrated in FIG. 8, the selection result of a candidate boundary point is designated with a white circle if its distance is within 1.5 from the temporary approximate line. A white circle represents a positive selection result (selected), and an X represents a negative selection result (not selected).

FIG. 9 is a schematic view illustrating an example of a data table of candidate boundary points after selection. In FIG. 9, the candidate boundary points with white circles in FIG. 8 are extracted. The candidate boundary points in FIG. 9 are used for calculating a boundary line between the code region and the marginal region.

The boundary line detecting section 205 calculates an approximate line using the candidate boundary points selected by the candidate boundary point selecting section 204. The boundary line detecting section 205 detects the calculated approximate line as a boundary line between the code region and the marginal region.

By detecting a boundary line as described above, precision for detecting a boundary line can be improved even if the captured image is defocused and distorted due to characteristics of a camera and an insufficient resolution.

(Rotation/Enlargement/Reduction Process)

Figure 10:
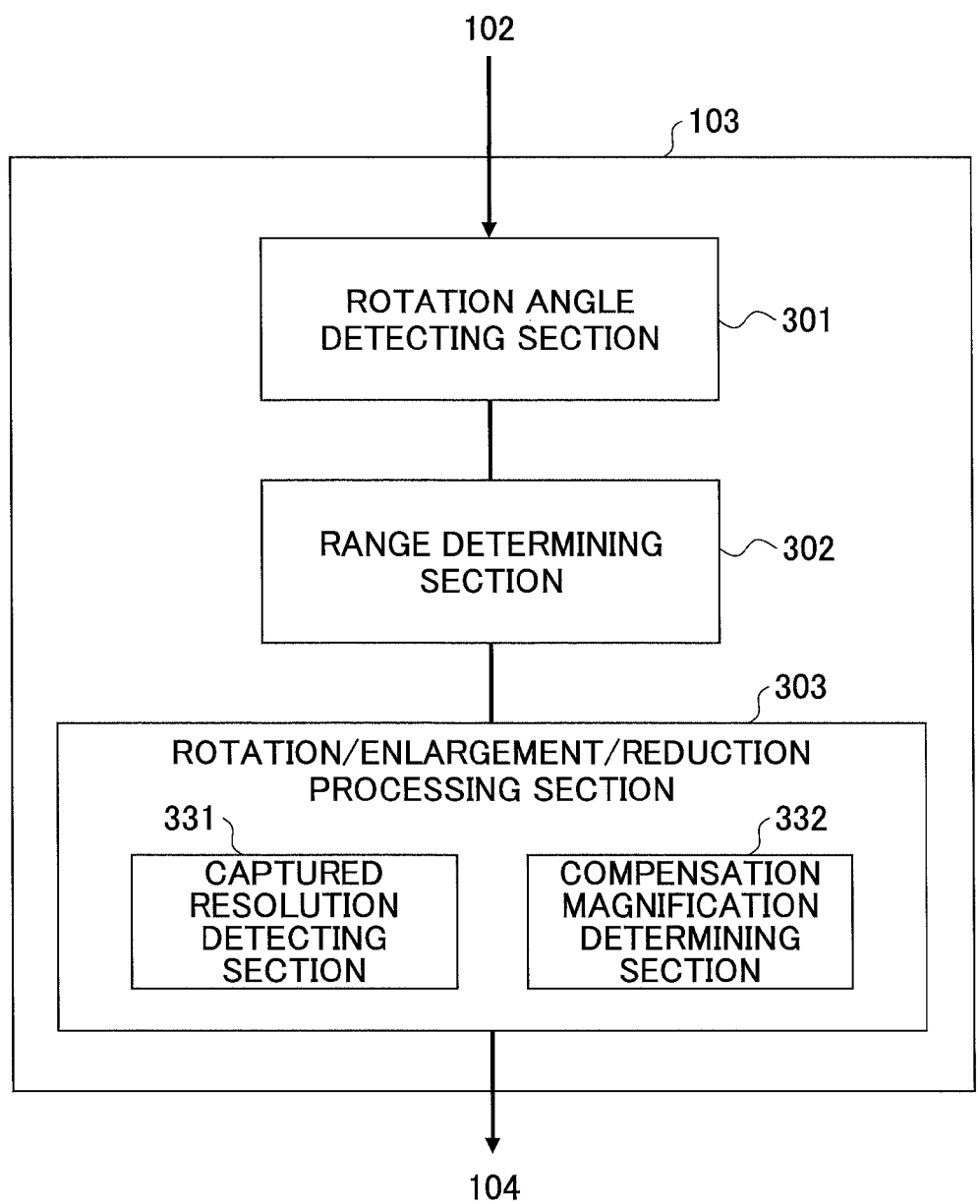
FIG. 10 is a block diagram illustrating an example of a configuration of a processing image generating section.

Next, a process will be described that generates an image to be processed for timing pattern detection. FIG. 10 is a block diagram illustrating an example of a configuration of the processing image generating section 103. The processing image generating section 103 illustrated in FIG. 10 includes a rotation angle detecting section 301, a range determining section 302, and a rotation/enlargement/reduction processing section 303.

The rotation angle detecting section 301 obtains a rotation angle of the two-dimensional code in the image data with respect to the horizontal or vertical line from a slope of the boundary line.

The range determining section 302 determines a range of the image that is suitable for a processing method to be used, using the position of the boundary line as a reference. For example, the range determining section 302 cuts out a rectangular area with a certain width along the boundary line between vertices including a timing pattern if processing for a timing pattern for DataMatrix (trademark).

The rotation/enlargement/reduction processing section 303 executes rotational compensation so that the boundary line becomes horizontal or vertical in the image data. For the rotational compensation, affine transform or projective transform may be used. Also, the rotation/enlargement/reduction processing section 303 executes enlargement compensation or reduction compensation to obtain a predetermined resolution and to interpolate pixels between originally adjacent pixels so that the shades values become proportionate.

By executing rotational compensation to make the code region upright in the image data as above, it becomes possible to detect positions in the subsequent processes with high precision and high speed. Also, if the resolution is low or high, by executing enlargement compensation or reduction compensation, it becomes possible to detect positions in the subsequent processes with high precision. With reduction compensation, it becomes possible to detect positions in the subsequent processes with high speed because the number of pixels is reduced.

Here, the rotation/enlargement/reduction processing section 303 includes a captured resolution detecting section 331, and a compensation magnification determining section 332.

The captured resolution detecting section 331 detects a width of a module adjacent to the boundary line, to obtain an approximate resolution within the width of the detected module.

The compensation magnification determining section 332 determines a reduction magnification factor if the detected resolution is greater than the predetermined reference resolution, or determines an enlargement magnification factor if the detected resolution is less than the predetermined reference resolution, to set the resolution of the image data equivalent to the reference resolution.

The reference resolution is set to an appropriate value depending on characteristics of a camera or a decoding algorithm to be used. In general, two or three pixels per module is set as the reference resolution based on the sampling theorem. However, if highly precise detection is required, a value greater than two or three pixels (for example, four to eight pixels) may be set. Also, if lower precision is acceptable and processing speed needs to be prioritized, a value less than two or three pixels (for example, one pixel) may be set.

In this way, an appropriate magnification factor can be set depending on characteristics of a camera or a decoding algorithm and usage, which enable a high-performance decoding process.

Figure 11:
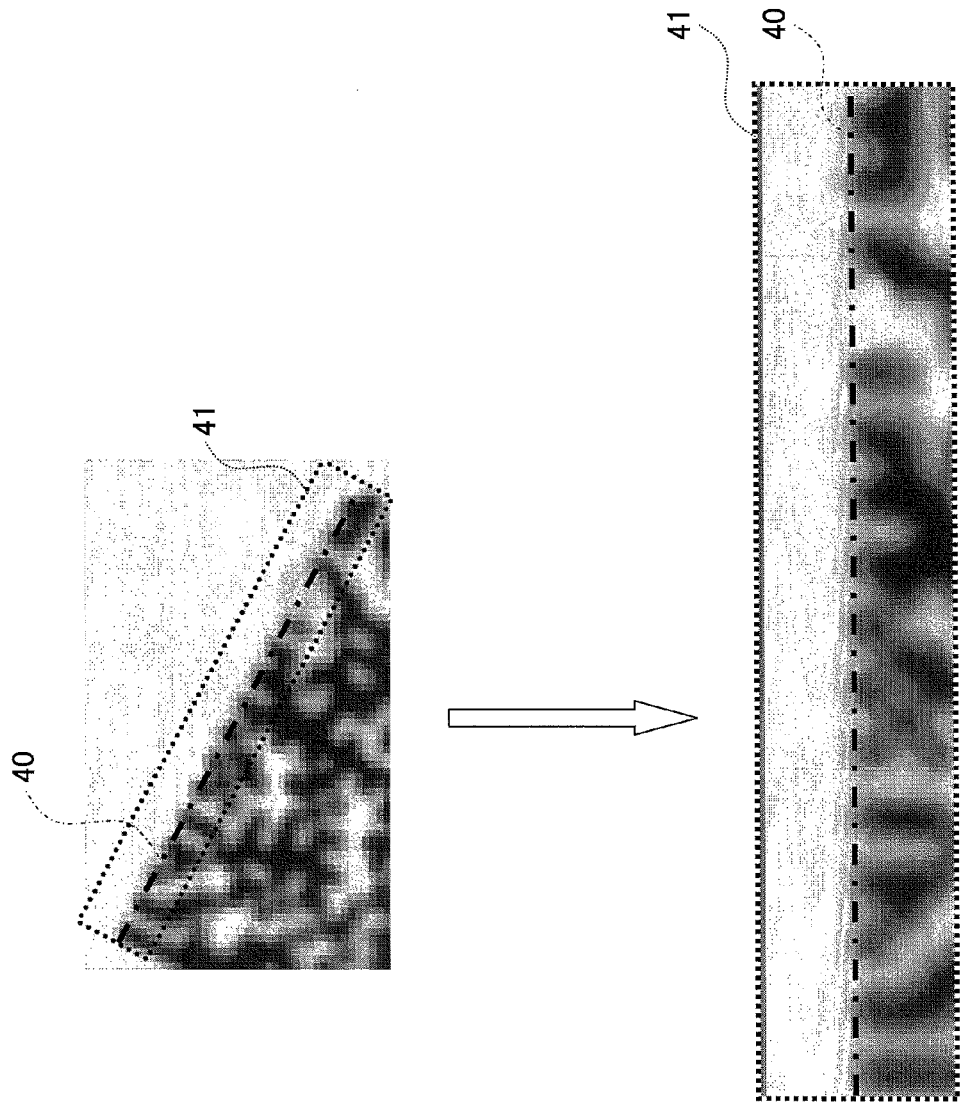
FIG. 11 is a schematic view illustrating a rotation/enlargement/reduction process.

FIG. 11 is a schematic view illustrating the rotation/enlargement/reduction process. With reference to FIG. 11, a concrete example of the rotation/enlargement/reduction process will be described.

Having detected a rotation angle of the boundary line, the range determining section 302 determines the range of the image to be processed. A line 40 in FIG. 11, represents a boundary line. As illustrated in FIG. 11, in case of detecting a timing pattern, a rectangular area is cut out as a range 41 for the image to be processed that includes a timing pattern as a whole and the boundary line 40 as a reference. For example, the range determining section 302 determines a rectangular area having a predetermined width from the boundary line 40 as the range 41 for the image to be processed.

The rotation/enlargement/reduction processing section 303 obtains the size of a module in the range 41 in FIG. 11. The size can be an approximate value. Therefore, the rotation/enlargement/reduction processing section 303 obtains the sizes of a predetermined number of modules along the timing pattern, and calculates the average value of the sizes to use it as the size of a module. Here, the size of a module is represented by the number of pixels.

Assume that a resolution of two pixels per module is obtained for the example in FIG. 11. If a reference resolution for the subsequent processes is set to eight pixels per module, the rotation/enlargement/reduction processing section 303 applies a quadruple (=8/2) enlargement with interpolation to the image to be processed.

Also, the rotation/enlargement/reduction processing section 303 applies the rotational compensation process to the image to be processed so that the boundary line 40 becomes horizontal in the image to be processed.

As a result, the image to be processed is compensated to have the resolution of eight pixels per module that is appropriate for the subsequent processes, which improves processing precision. Also, by applying the rotational compensation process, the false outline of the boundary line is compensated so that a clear boundary line is obtained, which also improves processing precision. Moreover, processing speed is improved in the subsequent processes when pixel scanning is executed because an index for only one of horizontal and vertical directions needs to be incremented.

(Timing Pattern Detection Process)

Figure 12:
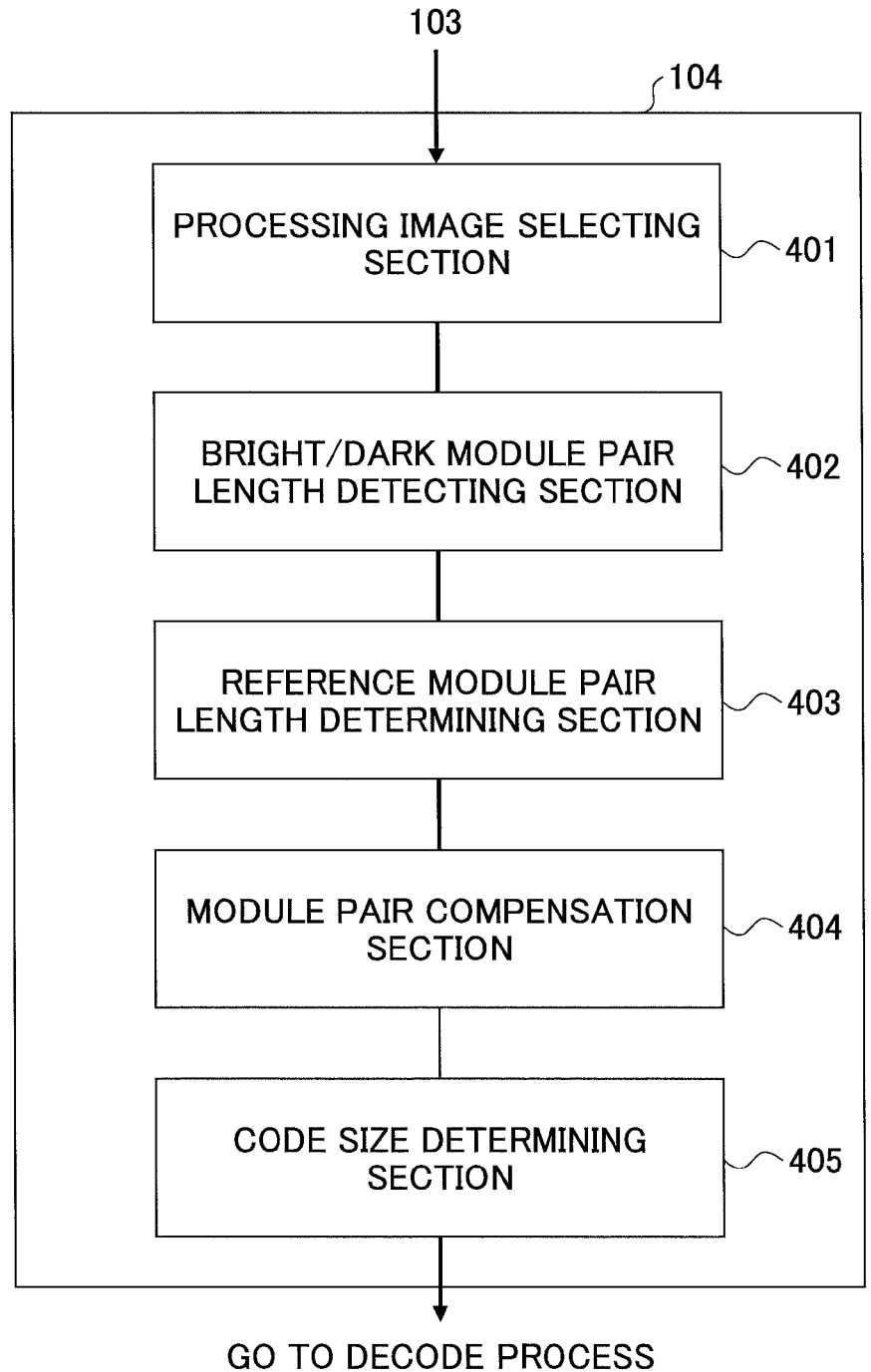
FIG. 12 is a block diagram illustrating an example of a configuration of a timing pattern detecting section.

Next, a timing pattern detection process will be described. FIG. 12 is a block diagram illustrating an example of a configuration of a timing pattern detecting section. The timing pattern detecting section 104 illustrated in FIG. 12 includes a processing image selecting section 401, a bright/dark module pair length detecting section 402, a reference module pair length determining section 403, a module pair compensation section 404, and a code size determining section 405.

The processing image selecting section 401 selects the image to be processed that includes a timing pattern. If the two-dimensional code is a DataMatrix (trademark), two of the four boundary lines are finder patterns and the other two boundary lines are timing patterns.

The processing image selecting section 401 selects an image to be processed that includes one of two boundary lines that are not finder patterns because a finder pattern including continuous black pixels can be detected easily. The selected image to be processed is used in the subsequent processes.

The bright/dark module pair length detecting section 402 obtains the lengths of module pairs in a timing pattern. Here, a module pair includes a bright module and a dark module adjacent to each other, which is called a "bright/dark module pair".

When determining the position of a boundary between bright/dark modules, the bright/dark module pair length detecting section 402 may make precision of the position higher than units of pixels by interpolating pixels between originally adjacent pixels so that the shade values change proportionately along these pixels.

The reference module pair length determining section 403 sorts the detected bright/dark module pair lengths in ascending order to calculate accumulated moving average values in order. The reference module pair length determining section 403 determines whether a bright/dark module pair length being processed is greater than an upper limit value that is obtained by multiplying the accumulated moving average value by a predetermined magnification factor.

If the determination result designates that it is greater than the upper limit value, the reference module pair length determining section 403 treats it as an abnormal value generated for some reason, and discards the bright/dark module pair length and greater bright/dark module pair lengths. An abnormal value may be generated by, for example, lack of a module mainly due to a defocus or the like.

The reference module pair length determining section 403 determines the reference module pair length to be, for example, the maximum value of accumulated moving average values obtained with remaining bright/dark module pair lengths. Here, the reference module pair length determining section 403 determines the reference module pair length after having processed a predetermined number of bright/dark module pairs.

This is because there are cases where a bright/dark module pair length is extremely small due to an abnormal situation generated for some reason. An abnormal situation includes a detection error of a module mainly due to a stain, an extremely thick or thin module width due to a defocus, and the like.

The module pair compensation section 404 sets a threshold value that is obtained by multiplying the reference module pair length by a predetermined magnification factor. If there exists a bright/dark module pair out of a range based on the threshold value, the module pair compensation section 404 compensates the number of module pairs based on the reference module pair length. This compensation process is applied if a timing pattern lacks a module or a module is erroneously detected.

(Compensation Process when a Timing Pattern Lacks a Module)

Next, a concrete compensation process will be described when a timing pattern lacks a module. The module pair compensation section 404 determines that a timing pattern lacks a module if a bright/dark module pair length is greater than the upper limit value determined by multiplying the reference module pair length by the predetermined magnification factor. The magnification factor is set to, for example, 1.4 taking round-off into consideration.

In this case, the module pair compensation section 404 adds one or more bright/dark modules to the abnormal bright/dark module pair. The number of modules to be added is calculated from the ratio of the bright/dark module pair length to the reference module pair length. For example, the module pair compensation section 404 assumes that the added modules are evenly placed in the bright/dark module pair when compensating by adding bright or dark modules. In this way, it is possible to detect the number of modules appropriately even if some modules are lacking.

(Compensation Process when a Module is Erroneously Detected)

Next, a concrete compensation process will be described when a module is erroneously detected in a timing pattern. The module pair compensation section 404 determines that a module is erroneously detected if a bright/dark module pair length is less than the lower limit value determined by multiplying the reference module pair length by the predetermined magnification factor. The magnification factor is set to, for example, 0.5 taking round-off into consideration. Here, erroneous detection may be caused by a stain or the like.

In this case, the module pair compensation section 404 adds the bright/dark module pair length to one of the adjacent bright/dark module pairs that has a shorter length, deletes the bright/dark module pair length, and subtracts one from the number of bright/dark module pairs. In this way, it is possible to detect the number of modules appropriately even if a module is erroneously detected.

The code size determining section 405 determines the code size as a twofold value of the number of module pairs after the compensation process.

Thus, by determining the reference module pair length as described above, it is possible to determine the reference module pair length appropriately even if some abnormal situation is generated with the image of a timing pattern. Also, by interpolating an abnormal bright/dark module pair using the reference module pair length, it is possible to determine the code size appropriately.

Figure 13:
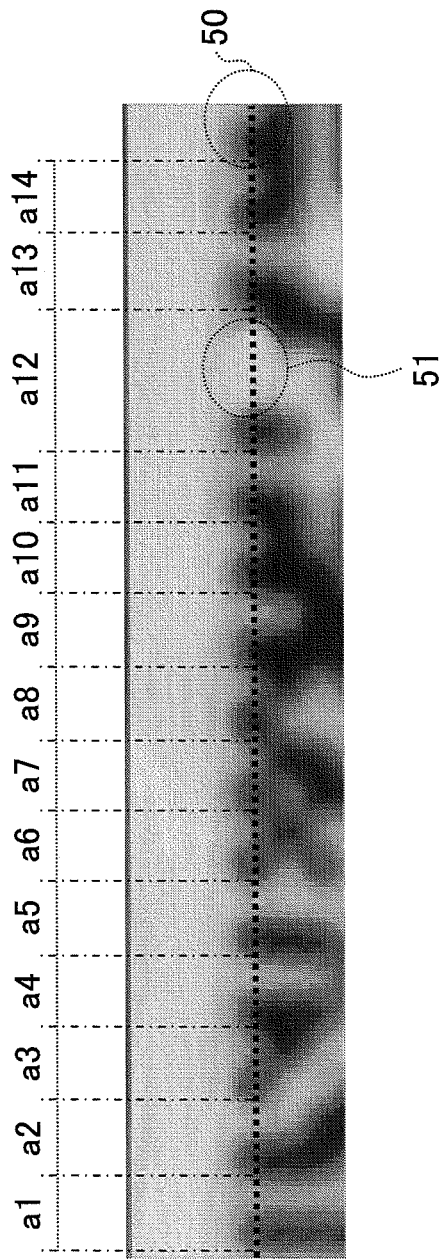
FIG. 13 is a schematic view illustrating an example of bright/dark module pair lengths.

Next, with reference to FIGS. 13-17, a concrete example of the timing pattern detection process will be described. FIG. 13 is a schematic view illustrating an example of bright/dark module pairs and their lengths. In an example illustrated in FIG. 13, there is a part 51 where a dark module of a timing pattern lacks.

The bright/dark module pair length detecting section 402 scans the center portion of modules constituting the timing pattern in the horizontal direction, and obtains bright (for example, white) and dark (for example, black) module pair lengths a1-a14.

Here, in the example illustrated in FIG. 13, a bright/dark module pair 50 at the right end positioned at the right of a14 is not used because error difference for detecting a bright module may become large. This is because a final bright module has continuous white pixels as it has no next module, which makes it difficult to determine the boundary of modules.

However, the final bright/dark module pair 50 may be used if error difference for detection is expected to be small, for example, for a case where the boundary line between the code region and the marginal region is explicitly recognized.

FIG. 14 is a schematic view illustrating an example of calculated bright/dark module pair lengths. As illustrated in FIG. 14, an identification number for a bright/dark module pair length is associated with a bright/dark module pair length. For example, the bright/dark module pair length of "a1" is "18", and the bright/dark module pair length of "a2" is "13". A pair length is represented by, for example, the number of pixels.

The reference module pair length determining section 403 sorts detected bright/dark module pair lengths in ascending order, and obtains accumulated moving averages in ascending order. Although all bright/dark module pair lengths should be the same value ideally, values may fluctuate due to a resolution, noise, and lack of modules.

FIG. 15 is a schematic view illustrating an example of bright/dark module pair lengths after sorting. An example illustrated in FIG. 15 is obtained by sorting the bright/dark module pair lengths illustrated in FIG. 14 in ascending order. The order after sorting becomes as follows.

a9<a2<a3<a14<a5< ... <a1<a12

The reference module pair length determining section 403 uses magnification factors applied to the reference module pair length for detecting an abnormal value, which is set to 0.5 for the lower limit, and 1.5 for the upper limit taking round-off into account.

The reference module pair length determining section 403 determines a pair length value as normal if it is within, for example, 0.5 to 1.4 times of the accumulated moving average. Here, values different from these magnification factors may be used depending on characteristics of a camera and algorithms used in the subsequent processes.

FIG. 16 is a schematic view illustrating an example of accumulated moving average values and ratios to the average values. As illustrated in FIG. 16, a bright/dark module pair length, an accumulated moving average value, and the ratio of the length to the average value are associated with each other. The ratio to the average value is a ratio of a bright/dark module pair length to an accumulated moving average value.

Figure 17:
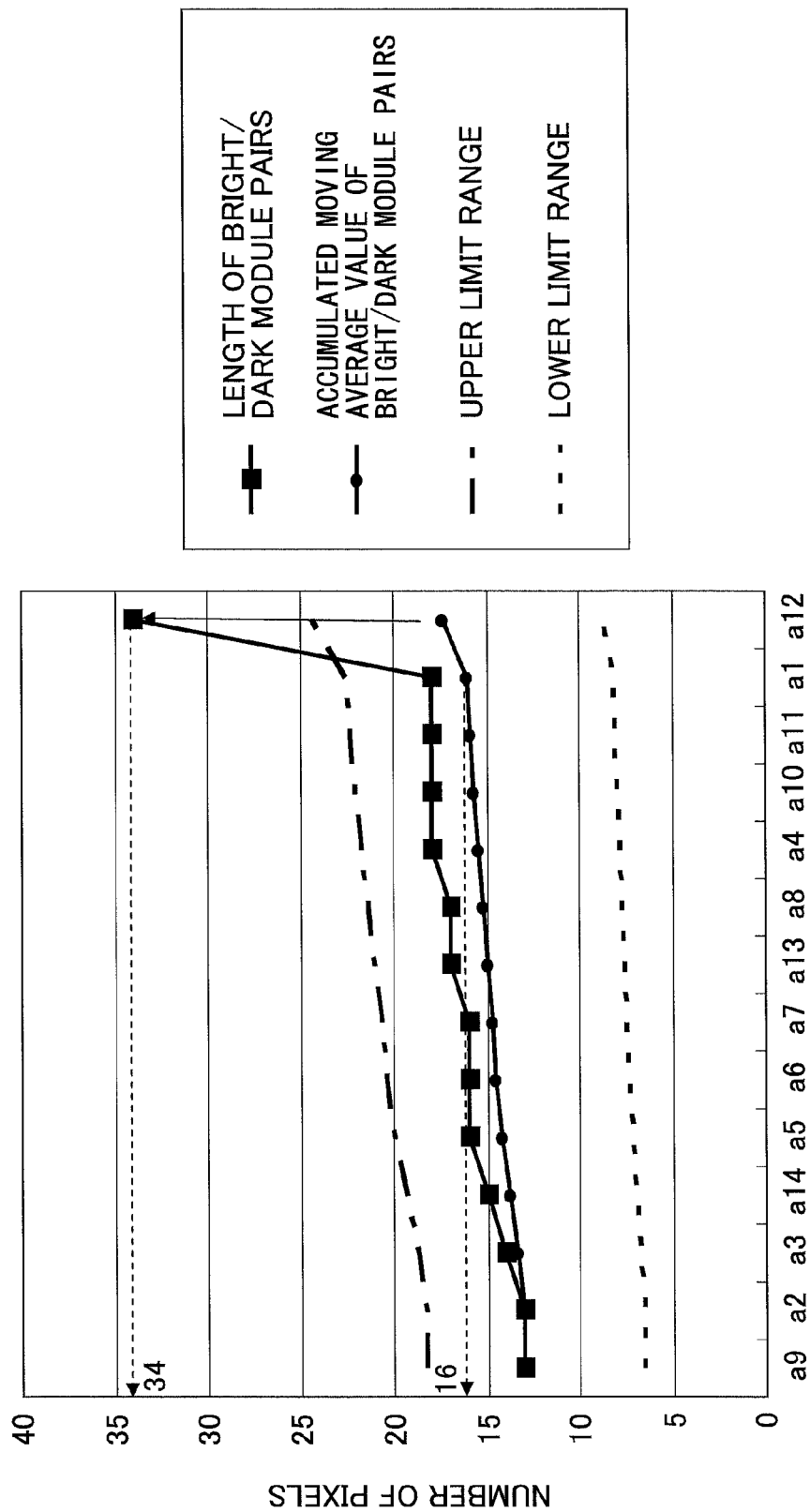
FIG. 17 is a schematic view illustrating a relationship among bright/dark module pair lengths, accumulated moving average values, upper limit values, and lower limit values.

FIG. 17 is a schematic view illustrating a relationship among bright/dark module pair lengths, accumulated moving average values, upper limit values, and lower limit values. In an example illustrated in FIG. 17, it is determined that some abnormality occurs with the bright/dark module pair length a12 as the bright/dark module pair length a12 is greater than the upper limit value.

Therefore, the reference module pair length determining section 403 determines that the reference module pair length to be the accumulated moving average value obtained with a9 to a1 excluding a12. In this case, referring to FIG. 16, the accumulated moving average value up to a1 is "16.08"; hence the reference module pair length is set to "16".

For the bright/dark module pair corresponding to a12 that has been determined as abnormal, the module pair compensation section 404 calculates a pair length for compensation by the following formula (2), $$\text{(pair length of } a12)/\text{(reference module pair length)} =$$
$$34 \text{ pixels}/16 \text{ pixels} = 2.1 \ldots \cong 2 \text{ (rounded off)} \quad \text{formula (2)}$$

The module pair compensation section 404 determines that the pair length of a12 is equivalent to the length of two bright/dark module pairs using the round-off value obtained by formula (2).

Therefore, the module pair compensation section 404 adds one lacking dark module for the subsequent processes. By adding one dark module, bright modules appear on both sides of the dark module, and consequently, two bright/dark module pairs are obtained, thus, a single bright/dark module pair is added to the existing module pair.

The code size determining section 405 obtains the module size and the code size by the following formulas (3)-(4).

$$\text{module size} = \text{(a normal accumulated moving average value)}/2 \quad \text{formula (3)}$$

$$\text{code size} = \text{(the number of module pairs after compensation)} \times 2 \quad \text{formula (4)}$$

The module size of the example illustrated in FIG. 13 is calculated as "8" by having the accumulated moving average value (16.08) up to a1 in FIG. 16 divided by two. Therefore, the number of pixels per side for the module illustrated in FIG. 13 is eight. The accumulated moving average value up to a1 is the same as the average value of normal values.

The code size of the example illustrated in FIG. 13 is determined by the following formula (5).

$$(14+1 \text{ (for added pair)}+1 \text{ (for right-end excluded pair)}) \times 2 \text{ (two modules per pair)} = 16 \times 2 = 32 \quad \text{formula (5)}$$

Therefore, the code size in FIG. 13 is determined as 32 modules.

<Operations>

Figure 18:
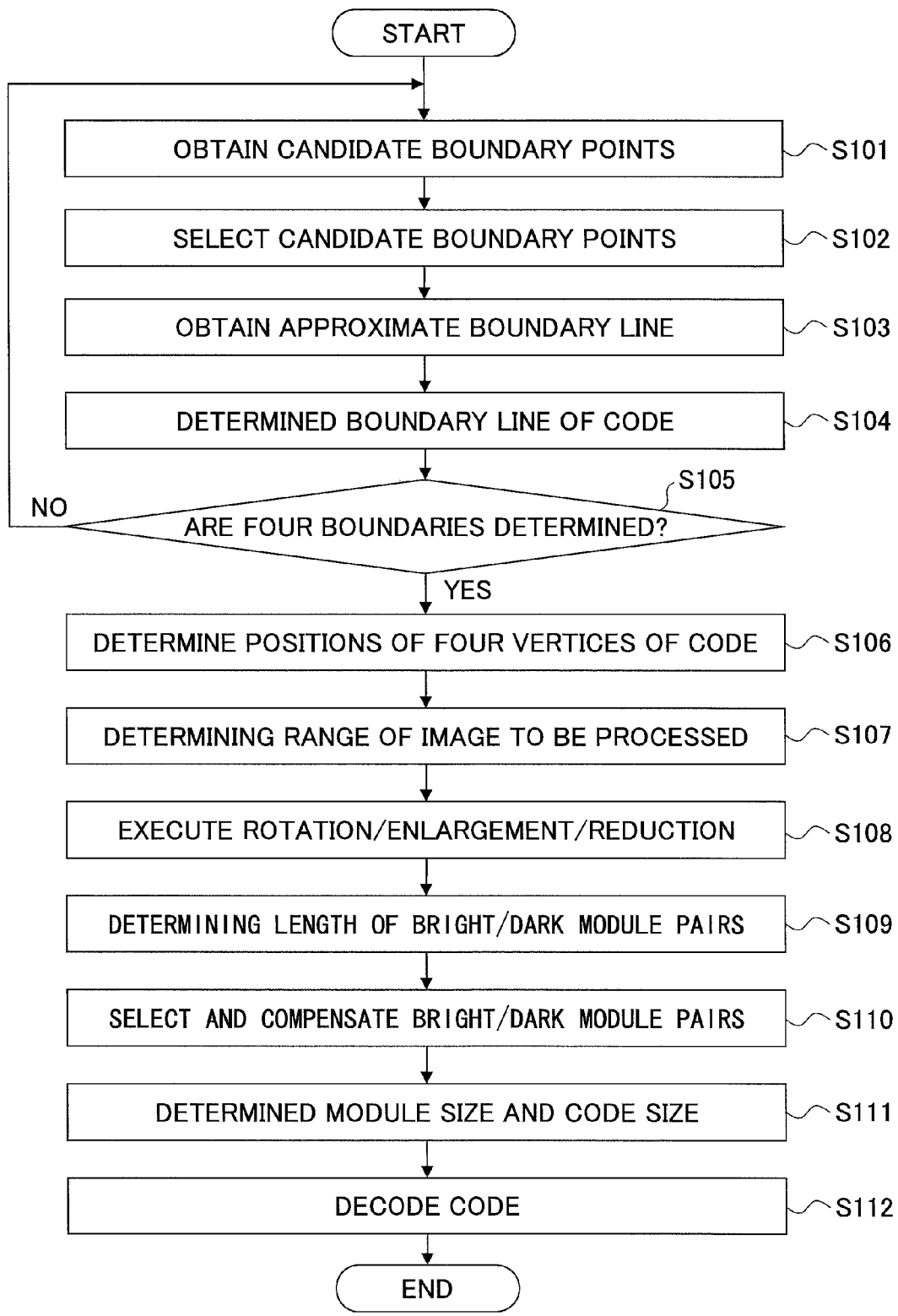
FIG. 18 is a flowchart illustrating an example of an image processing method according to an embodiment.

Next, operations of the image processing apparatus 110 will be described. FIG. 18 is a flowchart illustrating an example of an image processing method according to the present embodiment. At Step S101 illustrated in FIG. 18, the candidate boundary point detecting section 201 obtains candidate boundary points for a side line among four boundary lines of a two-dimensional code by scanning the two-dimensional code from the inside to the outside.

At Step S102, the temporary approximate line calculating section 203 obtains a temporary approximate line from the candidate boundary points. The candidate boundary point selecting section 204 selects the candidate points using the distance from the temporary approximate line as a selection criterion.

At Step S103, the boundary line detecting section 205 calculates an approximate line using the selected candidate boundary points. At Step S104, the boundary line detecting section 205 determines the calculated approximate line as the boundary line.

At Step S105, the boundary detecting section 101 determines whether Steps S101-S104 have been applied for detecting four boundary lines. If detection of four boundary lines has not been completed (Step S105-NO), the procedure goes back to Step S101, otherwise (Step S105-YES), the procedure proceeds to Step S106.

At Step S106, the vertex detecting section 102 extends the four boundary lines to obtain cross points and to determine the positions of four vertices of the code region of the two-dimensional code.

At Step S107, the range determining section 302 determines a range for the image to be processed including a timing pattern.

At Step S108, the rotation/enlargement/reduction processing section 303 applies rotational compensation and enlargement or reduction compensation to the image to be processed to generate the image data to be processed.

At Step S109, the bright/dark module pair length detecting section 402 obtains lengths of bright/dark module pairs in the timing pattern.

At Step S110, the reference module pair length determining section 403 selects a normal bright/dark module pair length using the reference module pair length. The module pair compensation section 404 compensates the bright/dark module pairs using the reference module pair length.

At Step S111, the code size determining section 405 determines the module size and code size of the two-dimensional code by the formulas (3)-(4) described above.

At Step S112, the decoding section 105 decodes the two-dimensional code based on the obtained boundary lines and four vertices, the module size, and the code size.

As described above, it is possible to improve precision for detecting a boundary line of a two-dimensional code according to the preferred embodiments. Also, it becomes possible to obtain a boundary line with high precision by obtaining candidate points with interpolation to select candidate points used for the boundary line according to the preferred embodiments.

It is also possible to detect the length of a bright/dark module pair with high precision and high speed by interpolating an image of the code region with reference to the boundary line to apply rotational compensation according to the preferred embodiments. It is also possible to appropriately obtain the code size and the like by selecting a correctly detected bright/dark module pair length among bright/dark module pair lengths in a timing pattern based on the distance from an accumulated moving average value according to the preferred embodiments.

Therefore, according to the preferred embodiments, it is possible to execute a high-performance, high-speed image recognition for an image including a two-dimensional code captured by, for example, an inexpensive digital camera.

Figure 19:
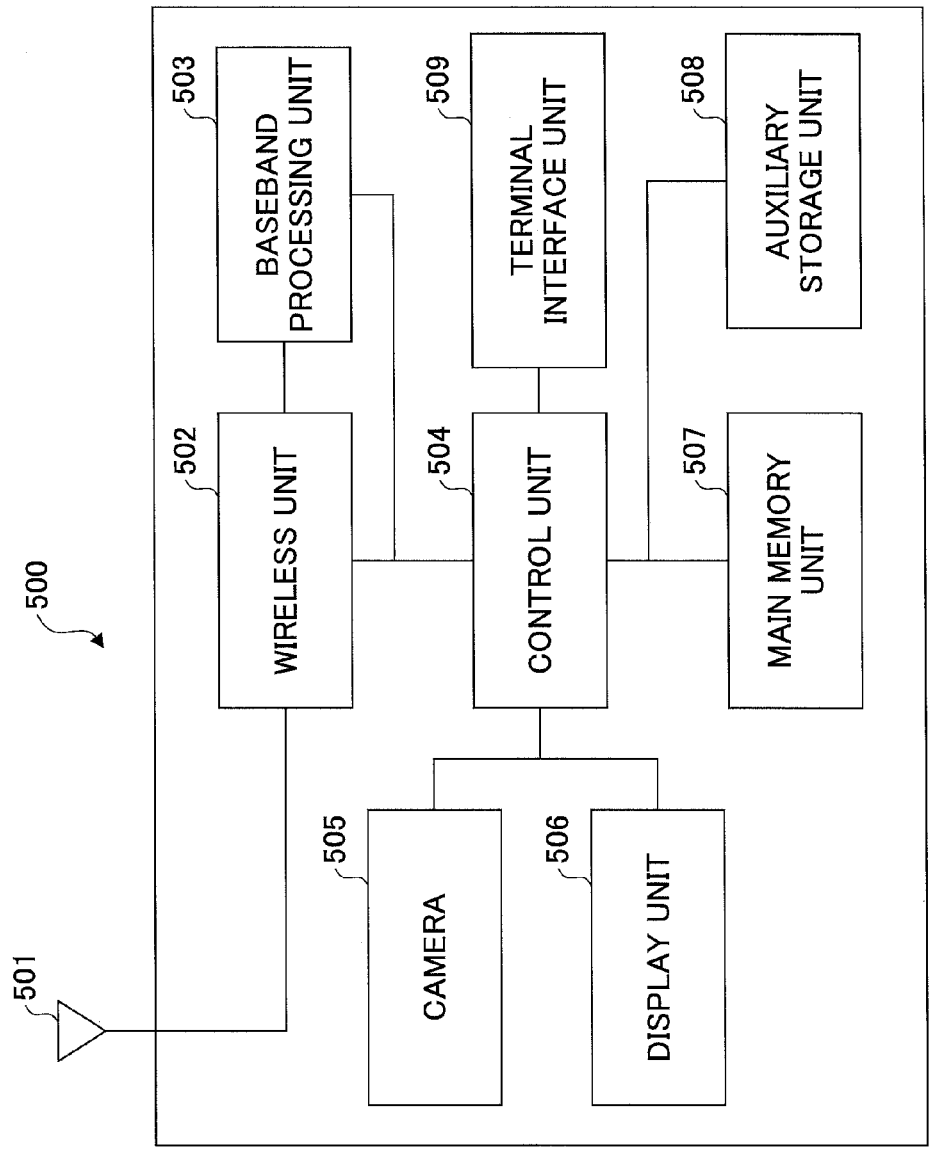
FIG. 19 is a block diagram illustrating an example of hardware of a portable terminal device 500.

Next, a portable terminal device 500 that has an image processing apparatus 110 built in will be described. FIG. 19 is a block diagram illustrating an example of hardware of a portable terminal device 500. The portable terminal device 500 includes an antenna 501, a wireless unit 502, a baseband processing unit 503, a control unit 504, a camera 505, a display unit 506, a main memory unit 507, an auxiliary storage unit 508, and a terminal interface unit 509.

The antenna 501 sends a radio signal amplified by the sending amplifier, and receives a radio signal sent from a base station. The wireless unit 502 applies a D/A conversion to the sending signal spread by the baseband processing unit 503, converts it to a high frequency signal by a quadrature modulation, and amplifies the signal by a power amplifier. The wireless unit 502 amplifies the received radio signal and applies an A/D conversion to the amplified signal to send it to the baseband processing unit 503.

The baseband unit 503 executes various baseband processing such as an addition of error correcting codes to sending data, data modulation, spread modulation, despreading of a received signal, determination of receiving environment, determination of a threshold value for each channel signal, error correction decoding, etc.

The control unit 504 is, for example, a processor, and executes wireless control such as sending/receiving of a control signal. Also, the control unit 504 executes an image processing program stored in the auxiliary storage unit 508 or the like to perform image processing described in the embodiments.

The camera 505 has, for example, a CCD (Charge Coupled Device), to generate a captured image including a two-dimensional code.

The display unit 506 is, for example, an LCD (Liquid Crystal Display) to display an image, text, and data stored in the two-dimensional code.

The main memory unit 507 is a ROM (Read-Only Memory), a RAM (Random Access Memory) or the like, which is a storage device to store or to temporarily store an OS, or the basic software executed by the control unit 504, programs such as application software or the like, and data. For example, candidate boundary points and accumulated moving average values described above are stored in the main memory unit 507.

The auxiliary storage unit 508 is an HDD (Hard Disk Drive) or the like, which is a storage device to store data related to the application software and the like.

The terminal interface unit 209 executes adapter processing for data, and interface processing with a handset and an external data terminal.

The image capturing unit 100 illustrated in FIG. 4 may be implemented with, for example, the camera 505, and the image processing apparatus 110 and the decoding unit 105 may be implemented with, for example, the control unit 504.

Configured in this way, it is possible for the portable terminal device 500 to capture a two-dimensional code that is processed with high speed and high precision. Also, it is possible to implement the image processing apparatus 110 according to the embodiments as one or multiple semiconductor integrated circuits in the portable terminal device 500.

Also, the disclosed technology can be implemented not only on the portable terminal device 500, but also on other devices. For example, an image processing apparatus 110 or image processing described above may be applied to a reader device for two-dimensional codes, a compact digital camera, or an information processing apparatus having a camera.

Also, it is possible to have a computer execute image processing described in the above embodiment by recording a program implementing image processing according to the above embodiment in a recording medium.

Also, it is possible to implement the above control processing by recording the program on a recording medium and having a computer or a portable terminal device read the recording medium on which the program is recorded. Here, various types of recording media can be used including a recording medium that records information optically, electrically, or magnetically such as a CD-ROM, a flexible disk, an optical magnetic disk and the like, and a semi-conductor memory and the like that records information electrically such as a ROM, a flash memory, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a candidate point detecting section configured to detect a plurality of candidate points on a boundary of a whole code region of a two-dimensional code in an image capturing the two-dimensional code, by scanning the image starting from an internal point of the two-dimensional code in the image and the boundary of the whole code region of the two-dimensional code in the image, the two-dimensional code including a plurality of modules being arranged in two dimensions;
a calculating section configured to calculate a first boundary line using the candidate points;
a selecting section configured to select the candidate points located within a distance less than a threshold value from the first boundary line; and
a boundary line detecting section configured to detect a second boundary line calculated using the selected candidate points selected by the selecting section.

2. The image processing apparatus as claimed in claim 1, wherein the threshold value is determined based on sizes of the modules.

3. The image processing apparatus as claimed in claim 2, wherein the candidate point detecting section estimates the sizes of the modules based on intervals of the detected modules when scanning from the internal point of the two-dimensional code.

4. The image processing apparatus as claimed in claim 1, wherein the calculating section calculates an external tangent line of the candidate points for setting the external tangent line as the first boundary line,
   wherein the selecting section selects the candidate points located within a distance less than the threshold value from the first boundary line in a direction inwards to an inner part of the image.

5. The image processing apparatus as claimed in claim 1, further comprising:
   a vertex detecting section configured to detect four vertices of the code region using the second boundary line;
   a generating section configured to generate an image to be processed from the four vertices detected by the vertex detecting section; and
   a pattern detecting section configured to detect a pattern including a plurality of pairs of a bright module and a dark module arranged alternately, and to compensate one of the pairs of modules based on the length of the one of the pairs of modules if a part of the pairs of modules is lacking.

6. The image processing apparatus as claimed in claim 5, wherein the pattern detecting section includes
   a determining section configured to determine a reference length for any single pair of the pairs of modules based on an accumulated moving average value calculated on lengths of the pairs of modules in an ascending order; and
   a compensation section configured to compensate the one of the pairs of modules if the length of the one of the pairs of modules exceeds an upper limit calculated from the reference length determined with the determining section, by using a ratio of the length of the one of the pairs of modules to the reference length.

7. The image processing apparatus as claimed in claim 6, wherein the compensation section deletes one of the lengths of the pairs of modules less than a lower limit value calculated from the reference length determined with the determining section.

8. The image processing apparatus as claimed in claim 5, wherein the generating section includes a processing section configured to enlarge or reduce the image to be processed so that the number of pixels in one of the modules becomes a predetermined number of pixels.

9. An image processing method executed by an image processing apparatus, the method comprising:
   detecting a plurality of candidate points on a boundary of a whole code region of a two-dimensional code in an image capturing the two-dimensional code, by scanning the image starting from an internal point of the two-dimensional code in the image and the boundary of the whole code region of the two-dimensional code in the image, the two-dimensional code including a plurality of modules being arranged in two dimensions;
   calculating a first boundary line using the candidate points;
   selecting the candidate points located within a distance less than a threshold value from the first boundary line; and
   detecting a second boundary line calculated using the selected candidate points.

10. A non-transitory computer-readable recording medium having a program stored therein for causing a computer to execute an image processing method, the method comprising:
   detecting a plurality of candidate points on a boundary of a code whole region of a two-dimensional code in an image capturing the two-dimensional code, by scanning the image starting from an internal point of the two-dimensional code in the image and the boundary of the whole code region of the two-dimensional code in the image, the two-dimensional code including a plurality of modules being arranged in two dimensions;
   calculating a first boundary line using the candidate points;
   selecting the candidate points located within a distance less than a threshold value from the first boundary line; and
   detecting a second boundary line calculated using the selected candidate points.

* * * * *